UNITED STATES PATENT OFFICE.

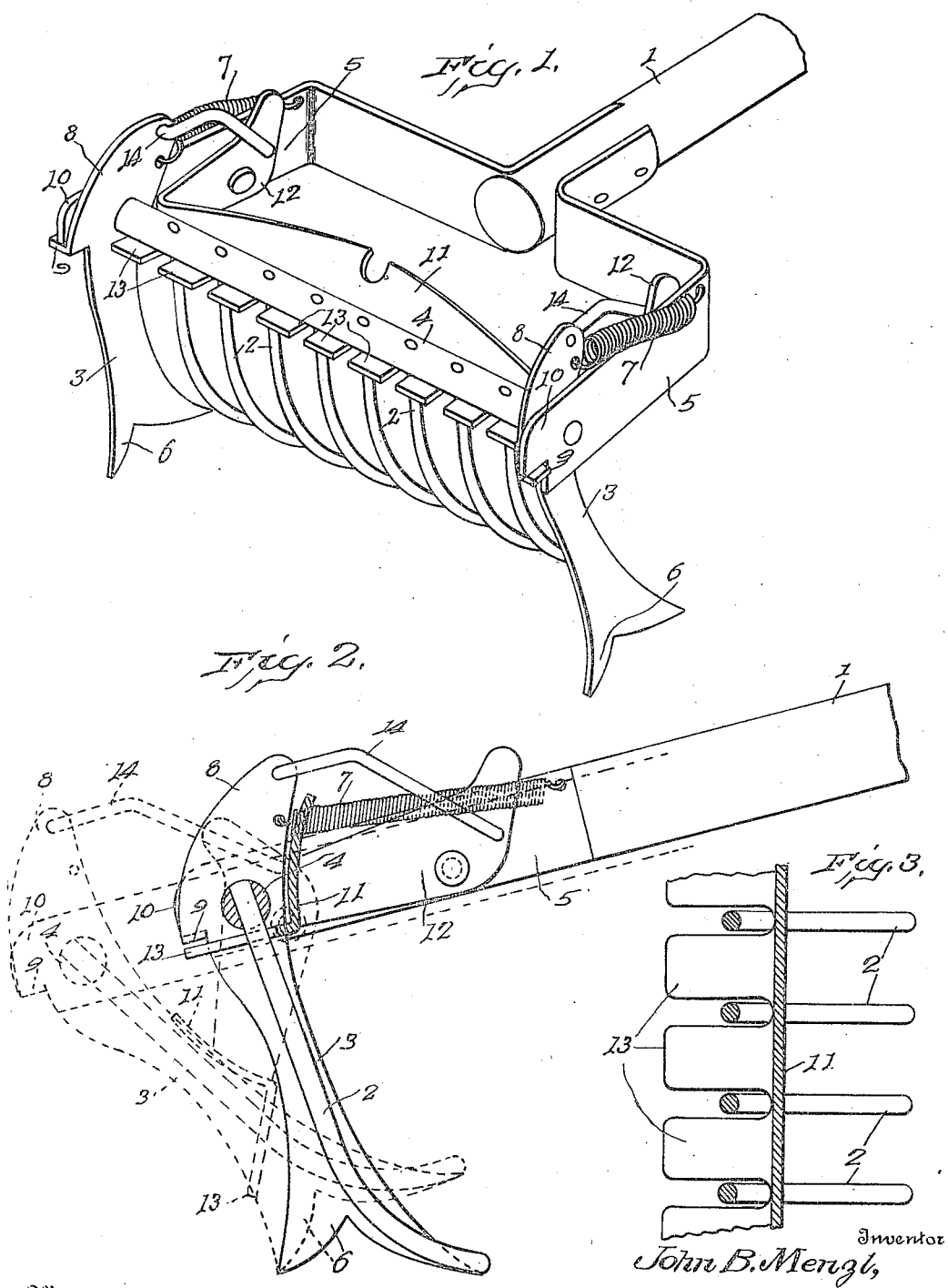

JOHN B. MENZL, OF DAYTON, OHIO.

RAKE.

962,576.

Specification of Letters Patent. Patented June 28, 1910.

Application filed January 14, 1910. Serial No. 538,130.

*To all whom it may concern:*

Be it known that I, JOHN B. MENZL, a citizen of the United States, residing at Dayton, in the county of Montgomery and State of Ohio, have invented certain new and useful Improvements in Rakes, of which the following is a specification, reference being had therein to the accompanying drawings.

This invention relates to rakes, and more particularly to means for clearing the teeth of a hand rake of accumulations of matter.

The object of the invention is to provide means for clearing the teeth of a rake which will be supported normally in a position near the upper ends of the teeth of the rake and may be positively actuated to remove the material from the teeth; and to provide such a clearer which may be positively operated by a longitudinal thrust on the handle of the rake.

To this end it is a further object of the invention to pivotally connect the teeth of the rake to the handle and to so connect these teeth with the clearer that, when the teeth are moved about their pivotal center by a thrust on the handle of the rake, this movement will impart movement to the clearer and cause it to move along said teeth.

In the accompanying drawings, Figure 1 is a perspective view of a rake embodying my invention; Fig. 2 is a sectional view of the rake head and clearer; and Fig. 3 is a fragmentary, sectional view of the rake head and clearer.

In these drawings I have illustrated one form of my invention and have shown the same as embodied in a rake comprising a handle 1 and teeth 2 and 3 rigidly secured one to the other and pivotally connected to the handle. In the construction here shown the several teeth are each rigidly secured to a shaft 4 which is journaled in a frame comprising arms 5 rigidly secured to the handle 1. These teeth are so arranged that a longitudinal thrust on the handle 1, when the teeth are in engagement with the ground, will move the teeth and the shaft to which they are connected about the axis of said shaft. In order to give the teeth a firmer grip on the ground and prevent the same sliding over the ground under the thrust imparted to the handle, I prefer to provide one or more of the teeth with a projection or heel 6 arranged a short distance above the point of the tooth and in such a position that it will engage the ground when a longitudinal movement is imparted to the handle. In the present instance I have shown the rake as having two of its teeth provided with these projections or heels, and, to this end, the two outermost teeth of the rake, as indicated at 3, are of special construction, while the intermediate teeth, 2, are of ordinary construction. The teeth are held normally in their operative position, at substantially right angles to the length of the handle 1, by means of springs 7 secured at one end to the arms 5 of the supporting frame for the rake head and secured at their opposite ends to projections 8 rigidly secured to the shaft 4 and preferably forming continuations of the two outermost teeth 3. The movement of the teeth and their shaft under the influence of the springs 7 is limited by means of stops 9 extending laterally from the two outermost teeth 3 and adapted to engage projections 10 formed on the ends of the respective arms 5 of the supporting frame.

The clearer may be of any suitable construction which will remove the accumulated matter from the teeth of the rake and is here shown as comprising a bar or plate 11 pivotally supported on the arms 5 of the supporting frame by means of arms 12 extending parallel with the arms 5 and pivotally connected thereto at some distance from the shaft 4. This bar is provided with teeth 13 extending between the teeth 2 and 3 of the rake and forming slots within which the rake teeth fit, the width of these slots being such that the clearer may move freely along the teeth, but will engage any matter which may adhere thereto. This clearer is so connected with the teeth of the rake that, when these teeth are moved about their pivotal center, the clearer will be caused to move along the teeth of the rake. This connection preferably comprises links 14 connected at one end to the respective projections 8 which are rigidly secured to the shaft 4 and at their other ends to the arms 12 of the clearer at points beyond their pivotal connections to the arms 5 of the supporting frame. Thus, the clearer will be held normally in its elevated position with its teeth arranged near the tops of the teeth of the rake, and, when the teeth of the rake are moved about their pivotal center against the tension of the springs 7, the clearer will be caused to travel downwardly along the teeth of the rake. As soon as the pressure on the handle 1 is relieved or the teeth are lifted out of engagement with the ground, the teeth and the clearer will both return automatically to their normal positions.

By means of the construction herein shown and described, the clearer is maintained normally in a position near the tops of the teeth where it does not in any way interfere with the use of the rake and does not move along the teeth except at the will of the operator; and, when it does so move along the teeth of the rake, its movement is positive and is under the control of the operator. Further, both the teeth and the clearer are automatically returned to their normal positions as soon as the pressure on the handle is released or the teeth are lifted from the ground.

I wish it to be understood that I do not desire to be limited to the details of construction shown and described, for obvious modifications will occur to a person skilled in the art.

Having thus fully described my invention, what I claim as new and desire to secure by Letters Patent, is:—

1. In a rake, the combination, with a handle, and a plurality of teeth, of a clearer, and means controlled by said handle for positively actuating said clearer.

2. In a rake, the combination, with a handle, and a plurality of teeth, of a clearer, means for retaining said clearer normally near the upper ends of said teeth, and means controlled by said handle for positively actuating said clearer.

3. In a rake, the combination, with a handle and a plurality of teeth, of a clearer supported normally near the upper ends of said teeth, and means actuated by a thrust on said handle for moving said clearer along said teeth.

4. In a rake, the combination, with a handle, and a plurality of teeth pivotally supported on said handle, of a clearer arranged to move along said teeth, and means controlled by the movement of said teeth about their pivotal center for actuating said clearer.

5. In a rake, the combination, with a handle, and a plurality of teeth pivotally supported on said handle, of a clearer pivotally supported on said handle and arranged to move along said teeth, and means controlled by the movement of said teeth about their pivotal center for moving said clearer about its pivotal center.

6. In a rake, the combination, with a handle, supporting arms carried by said handle, a shaft journaled in said arms, and teeth rigidly secured to said shaft, of a clearer arranged to move along said teeth, and means actuated by the rotation of said shaft for imparting movement to said clearer.

7. In a rake, the combination, with a handle, supporting arms carried by said handle, a shaft journaled in said arms, and teeth rigidly secured to said shaft, of a clearer having arms pivotally mounted on said supporting arms, projections extending from said shaft, and links connecting the arms of said clearer with the respective projections.

8. In a rake, the combination, with a handle, teeth pivotally mounted on said handle, and means for retaining said teeth normally in their operative relation to said handle, of a clearer arranged to move along said teeth, and means operated by the movement of said teeth to actuate said clearer when said teeth are moved about their pivotal center and to maintain said clearer in its normal position when said teeth are in their normal position.

9. In a rake, the combination, with a handle, a supporting frame carried by said handle, a shaft journaled in said supporting frame, a plurality of teeth rigidly secured to said shaft, projections extending from said shaft, springs connecting said projections to said supporting frame to retain said teeth normally in their operative relation to said handle, of a bar extending parallel to said shaft and having teeth extending between the teeth of said rake, arms supporting said bar and pivotally connected to said supporting frame, and links connecting said arms at points beyond their pivotal connection to said frame with the projections carried by said shaft.

In testimony whereof, I affix my signature in presence of two witnesses.

JOHN B. MENZL.

Witnesses:
HOWARD B. CROMER,
LEONA KRAMER.